(12) United States Patent
Schmitz et al.

(10) Patent No.: US 8,795,900 B2
(45) Date of Patent: Aug. 5, 2014

(54) SINGLE-LAYER MICROPOROUS FOIL FOR BATTERIES HAVING SHUT-OFF FUNCTION

(75) Inventors: Bertram Schmitz, Saaregemuines (FR); Detlef Busch, Saarlouis (DE)

(73) Assignee: Treofan Germany GmbH & Co. KG (DE)

( * ) Notice: Subject to any disclaimer, the term of this patent is extended or adjusted under 35 U.S.C. 154(b) by 288 days.

(21) Appl. No.: 13/139,147

(22) PCT Filed: Dec. 5, 2009

(86) PCT No.: PCT/EP2009/008705
§ 371 (c)(1),
(2), (4) Date: Jun. 10, 2011

(87) PCT Pub. No.: WO2010/066390
PCT Pub. Date: Jun. 17, 2010

(65) Prior Publication Data
US 2011/0244336 A1    Oct. 6, 2011

(30) Foreign Application Priority Data
Dec. 12, 2008   (DE) .......................... 10 2008 061 746

(51) Int. Cl.
*H01M 2/16* (2006.01)
(52) U.S. Cl.
USPC .......................................... 429/253; 429/249
(58) Field of Classification Search
CPC .......... H01M 2/16; H01M 2/14; H01M 2/145
USPC ....................................................... 429/253
See application file for complete search history.

(56) References Cited

U.S. PATENT DOCUMENTS

| | | | |
|---|---|---|---|
| 5,532,335 A | 7/1996 | Kimball et al. | |
| 5,691,077 A | 11/1997 | Yu | |
| 6,300,415 B1 * | 10/2001 | Okayama et al. | 525/191 |
| 7,744,992 B2 | 6/2010 | Schmitz et al. | |
| 2005/0212183 A1 * | 9/2005 | Busch et al. | 264/509 |

FOREIGN PATENT DOCUMENTS

| | | | | |
|---|---|---|---|---|
| DE | 3610644 A1 | | 10/1986 | |
| DE | 4420989 A1 | | 12/1995 | |
| DE | 19848245 A1 | | 5/2000 | |
| DE | AU2009242416 | * | 11/2009 | 264/509 |
| EP | 0557721 A2 | | 9/1993 | |
| EP | 0668156 A1 | | 8/1995 | |
| EP | 0 953 589 A2 | | 11/1999 | |
| EP | 1 114 840 A1 | | 7/2001 | |
| WO | WO-00/68294 A1 | | 11/2000 | |
| WO | WO-03/091316 A1 | | 11/2003 | |
| WO | WO-2003091316 A1 | | 11/2003 | |
| WO | WO-2004033174 A1 | | 4/2004 | |
| WO | WO-2006040057 A1 | | 4/2006 | |

OTHER PUBLICATIONS

U.S. Appl. No. 13,139,121, filed Jun. 10, 2011, Schmitz et al.
Arora, P., et al., "Battery Separators," Chem. Rev. 2004, vol. 104, pp. 4419-4462.

* cited by examiner

*Primary Examiner* — Gary Harris
(74) *Attorney, Agent, or Firm* — Novak Druce Connolly Bove + Quigg LLP

(57) ABSTRACT

Single-layer or multilayer, biaxially oriented, microporous foil having a shut-off function, which comprises propylene homopolymer and propylene block copolymer, polyethylene and β-nucleating agent.

20 Claims, No Drawings

SINGLE-LAYER MICROPOROUS FOIL FOR BATTERIES HAVING SHUT-OFF FUNCTION

CROSS-REFERENCE TO RELATED APPLICATIONS

This application is a national stage application (under 35 U.S.C. §371) of PCT/EP2009/008705, filed Dec. 5, 2009, which claims benefit of German application 10 2008 061 746.6, filed Dec. 12, 2008.

BACKGROUND OF THE INVENTION

The present invention relates to a microporous foil and use thereof as a separator.

Modern devices rely on an energy source, such as batteries or rechargeable batteries, that enable the devices to be used in any location. Batteries have the disadvantage that they must be disposed of. Therefore, the use of rechargeable batteries (secondary batteries) that can be recharged repeatedly with the aid of chargers plugged into the mains is becoming more and more widespread. Nickel-cadmium (NiCd) rechargeable batteries, for example, have a service life of about 1000 recharging cycles if they area used correctly.

Batteries and rechargeable batteries always consist of two electrodes which are immersed in an electrolyte solution, and a separator, which separates the anode and the cathode from one another. The various types of rechargeable battery differ in the electrode material, the electrolyte, and the separator used. A battery separator has the task of keeping apart the cathode and the anode in batteries, or the negative and the positive electrode in rechargeable batteries. The separator must be a barrier that insulates the two electrodes from each other, to prevent internal short circuits. Yet at the same time the separator must be permeable for ions so that the electrochemical reactions can take place in the cell.

A battery separator must be thin, so that its internal resistance is as low as possible and high packing density can be achieved. This is the only way to achieve good performance data and high capacitances. It is also essential for the separators to soak up the electrolyte, and when the cells are full to ensure the exchange of gases. Whereas before fabrics or the like were used, nowadays most separators are made from microporous materials such as fleeces and membranes.

In lithium batteries, the occurrences of short circuits is a problem. Under thermal load, the battery separator in lithium ion batteries is prone to melt, resulting in a short circuit with disastrous consequences. Similar dangers exist if the lithium batteries are damaged mechanically or overcharged by chargers with faulty electronics.

In order to increase the safety of lithium ion batteries, shut-off membranes were developed. These special separators close their pores very rapidly at a given temperature, which is significantly lower than the melting point or ignition point of lithium. This largely prevents the catastrophic effects of a short circuit in lithium batteries.

At the same time, however, high mechanical strength is also desirable in separators, and this is lent to them by materials with high melting temperatures. For example, polypropylene membranes are advantageous because of their good resistance to perforation, but at about 164° C. the melting point of polypropylene is very close to the flame point of lithium (170° C.).

It is known in the related art to combine polypropylene membranes with other layers constructed from materials that have a lower melting point, for example polyethylene. Of course, such modifications of the separators must not impair the other properties such as porosity, nor hinder ion migration. However, the overall effect of including polyethylene layers on the permeability and mechanical strength of the separator is very negative. It is also difficult to get the polyethylene layers to adhere to polypropylene, and these layers can only be joined by laminating, or only selected polymers of both classes can be co-extruded.

There are essentially four different methods for manufacturing foils with high porosities known in the related art: filler methods, cold stretching, extraction methods, and β-crystallite methods. These methods differ fundamentally in the various mechanisms by which the pores are created.

For example, porous foils can be manufactured by adding very large quantities of filler materials. When they are stretched, the pores are created by the incompatibility between the filler materials and the polymer matrix. In many applications, the large quantities of as much as 40% by weight filler materials are associated with undesirable side effects. For example, the mechanical strength of such porous foils is reduced by the large content of filler materials despite stretching. Moreover, their pore size distribution is very wide, so that these porous foils are essentially unsuitable for use in lithium ion batteries.

In the "extraction methods", the pores are created in principle by eluting a component from the polymer matrix with suitable solvent. In this context, a wide range of variants have been developed, and they differ in the types of additives and the suitable solvents that are used. Both organic and inorganic additives can be extracted. This extraction may be carried out as the last process step in the manufacture of the foil or it may be combined with a subsequent stretching step.

An older, method that has proven successful in practice relies on stretching the polymer matrix at very low temperatures (cold stretching). For this, the foil is first extruded in the normal way and then it is tempered for several hours to increase its crystalline content. In the following process step, it is cold stretched lengthwise at very low temperatures to create a large number of faults in the form of tiny microcracks. This prestretched, intentionally flawed foil is then stretched in the same direction again, with higher factors and at elevated temperatures, so that the flaws are enlarged to create pores that form a network-like structure. These foils combine high porosities with good mechanical strengths in the direction in which they are stretched, generally the lengthwise direction. However, their mechanical strength in the transverse direction remains unsatisfactory, which in turn means that their resistance to perforation is poor and they have a high tendency to splice in the lengthwise direction. The method is also generally expensive.

Another known method for producing porous foils is based on the addition of β-nucleating agents to polypropylene. In the presence of the β-nucleating agent, the polypropylene forms "β-crystallites" in high concentrations as the melt cools down. In the subsequent lengthwise stretching, the β-phase is converted into the alpha modification of the polypropylene. Since these different crystal forms vary in density, initially a large number of microscopic flaws are created here too, and they too are expanded to create pores by the stretching. The foils that are produced by this method have high porosities and good mechanical strengths both longitudinally and transversely and are extremely inexpensive. These foils will be referred to as β-porous foils in the following.

It is known that porous foils which are manufactured according to the extraction method may be provided with a shut-off function by the addition of a low-melting component. Since in this method orientation takes place first and the pores are created on the orientated foil afterwards by extraction, the low-melting component cannot hinder the formation of pores. Membranes with shut-off function are therefore often produced by this method.

Low-melting components may also be added to lend a shut-off function in the cold stretching method. The first stretching step must be carried out at very low temperatures anyway, in order to create the microcracks in the first place. The second, orientation step is generally performed in the same direction, usually MD, and may therefore also take place at a relatively low temperature, since the molecule chains are not re-orientated. The mechanical properties of these foils are deficient particularly in the transverse direction.

As an alternative, methods were developed in which various single-layer foils with different functions are first produced separately, then these are joined, that is to say laminated, to form a membrane with shut-off function. In this case, it is possible to optimise each layer individually with respect to its desired function without running the risk that that porosity of the membrane might be impaired by the shut-off function. Of course, these methods are very expensive and technically very involved.

Membranes consisting of β-porous foils have the drawback that until now they could only be provided with a corresponding shut-off function by laminating in this way. In order to create adequate porosities together with the desired mechanical strengths using β-crystallites and subsequent biaxial stretching, the foil must first be orientated longitudinally and then stretched transversely. Transverse stretching of a foil that has already been orientated longitudinally represents a de facto re-orientation of the polymer molecules and is contingent on significantly greater mobility of the polymer chains than is necessary for the first, lengthwise orientation of the unstretched polymers. Accordingly, transverse stretching of a polypropylene foil that has already been orientated longitudinally requires an elevated temperature, considerably higher than the desired shut-off temperature.

In the course of experiments relating to the present invention, it was therefore expected that the pores created by lengthwise and transverse stretching would be closed again by a low-melting component as early as the transverse stretching stage to such a degree that the porosity would be substantially limited. Lowering the transverse stretching temperature is subject to mechanical limits, since the longitudinally stretched polypropylene can only be stretched transversely at temperatures of at least 145° C., and generally undergoes transverse stretching at temperatures from 150 to 160° C. Consequently, there is no method known in the related art—except for lamination—by which β-porous foils can be provided with a shut-off function.

BRIEF SUMMARY OF THE INVENTION

The object of the present invention consisted in providing a porous foil, or a separator for batteries, which would have a shut-off function, high porosities and excellent mechanical strength. It should also be possible to produce the membrane by inexpensive methods.

The task underlying the invention is solved with a biaxially oriented, single-layer, microporous foil with shut-off function whose microporosity is created by converting β-crystalline polypropylene when the foil is stretched, and which is constructed essentially from propylene homopolymer with propylene block copolymer I and β-nucleating agent and polyethylene, wherein the foil has a Gurley value of 50 to 5000 s, an e-modulus in the lengthwise direction of 300-1800 N/mm$^2$, and in the transverse direction from 400-3000 N/mm$^2$, and after exposure to a temperature of 130° C. for 5 minutes the foil exhibits a Gurley value of at least 5000 s, wherein the Gurley value after this temperature treatment is at least 1000 s higher than before.

DETAILED DESCRIPTION OF THE INVENTION

Surprisingly, the foil according to the invention exhibits high porosities, very good mechanical strength and the desired shut-off function. The Gurley value of the foil according to the invention is generally in a range from 50-5000 s; preferably 100 to 2000 s, particularly 120 to 800 s. This gas permeability of the foil is significantly reduced if the foil is exposed to an elevated temperature. For the purposes of the present invention, this function is referred to as the "shut-off function". Analysis is generally carried out in accordance with the method described for analysing gas permeability, this measurement being taken before and after thermal loading of the foil. For example, the Gurley value of the foil rises to at least 5000 s, preferably to at least 8000 s, particularly to at least 10,000 to 250,000 s after heat treatment at 130° C. lasting 5 minutes, wherein the Gurley value with this heat treatment increases by at least 1000 s, preferably by 5000 to 250,000 s, and particularly by 10,000 to 200,000 s. The Gurley value indicates (in secs) how it takes for a given quantity of air (100 cm$^3$) to pass through a defined area of the foil (1 inch$^2$). The maximum value may thus be an infinite period of time. Accordingly, the second Gurley value, that is to say the Gurley value after heat treatment, which is used to describe a shut-off function, is a range with no upper limit. Ideally, the membrane is completely impermeable after the thermal treatment and does not allow any more air to pass at all, meaning that the Gurley value is infinite. The e-modulus of the foil according to the invention is 300 to 1800 N/mm2, preferably 400 to 1500 N/mm2, and particularly 600 to 1200 N/mm2 in the lengthwise direction, and 500 to 3000 N/mm2, preferably 800 to 2500 N/mm2, and particularly 1000 to 2200 N/mm2 in the transverse direction.

When used as a separator in batteries as provided for in the present invention, the microporous foil is capable of effectively preventing the consequences of a short circuit. If elevated temperatures occur inside the battery due to a short circuit, the pores of the foil according to the invention close rapidly in such manner as to prevent any further gases or ions from passing through, thereby halting the chain reaction.

Surprisingly, however, the foil exhibits very high porosities despite the addition of polyethylene. This is surprising for two reasons. The polyethylene content of, for example, 20% by weight in the polymer mixture results in a smaller percentage of β-crystallites in the cooled polymer mass. For polypropylene foils without a polyethylene additive, the porosity is determined directly by the proportion of β-crystallites. The fewer β-crystallites there are contained in the cooled, unstretched polypropylene foil, the lower the porosity that is formed after the PP foil is stretched. Surprisingly however, the porosity of the foil according to the invention with polyethylene is no worse than a polypropylene foil having similar composition and being produced in the same way but containing no polyethylene, even though the fraction of β-crystallite in the unstretched prefilm is lower. It was also expected that in the case of this composition of the foil, the transverse stretching temperature would still have to be so high that the polyethylene causes the pores to close during transverse stretching because of its low melting point, which would also contribute to significant inhibition of good porosity. Surprisingly, it is possible to lower the transverse stretching temperature for stretching the polypropylene foil to the point that the polyethylene does not negatively affect the porosity, yet the foil may still be stretched enough to achieve good mechanical strength. At the same time, it was found that a quantity of polyethylene that is sufficient to trigger the shut-off effect does not at the same time ruin the porosity. Thus, surprisingly, it has been possible to provide a foil that exhibits high porosities, due to the biaxial stretching of β-crystallites, good mechanical strengths, and a shut-off effect.

The main components of the foil according to the invention are propylene homopolymer and propylene block copolymer, polyethylene, and at least one β-nucleating agent, also possibly small quantities of other polyolefins providing they do not negatively affect the porosity and other important properties, and usual additives as required, for example stabilisers, neutralisers, each in effective quantities.

In general, the layer contains 45 to 75% by weight, preferably 50 to 70% by weight propylene homopolymers and 10-45% by weight, preferably 20 to 35% by weight propylene block copolymers, and 15 to 45% by weight, preferably 15 to 30% by weight polyethylene, and 0.001 to 5% by weight, preferably 50-10,000 ppm of at least one β-nucleating agent, relative to the weight of the layer. If additional polyolefins are included in the layer, the proportion of the propylene homopolymer or the block copolymer is reduced correspondingly. In general, if they are added, the quantity of additional polymers will be from 0 to <10% by weight, preferably from 0 to 5% by weight, particularly from 0.5 to 2% by weight. Similarly, the proportion of propylene homopolymer or propylene block copolymer will be reduced as above if larger quantities of up to 5% nucleating agent are used. Additionally, the layer may also contain usual stabilisers and neutralising agents, and if required other additives in the usual low quantities of less than 2% by weight.

Suitable propylene homopolymers contain 98 to 100% by weight, preferably 99 to 100% by weight propylene units, and have a melting point (DSC) of 150° C. or higher, preferably 155 to 170° C., and in general a melt-flow index of 0.5 to 10 g/10 min, preferably 2 to 8 g/10 min, at 230° C. and a force of 2.16 kg (DIN 53735). Isotactic propylene homopolymers with an n-heptane-soluble fraction of less than 15% by weight, preferably 1 to 10% by weight are preferred propylene homopolymers for the layer. Advantageously, isotactic propylene homopolymers with high chain isotacticity of at least 96%, preferably 97-99% ($^{13}$C-NMR; triad method) may also be used. These raw materials are known in the related art as HIPP (High Isotactic Polypropylene) or HCPP (High Crystalline Polypropylene) polymers, and are characterized by the high stereoregularity of their polymer chains, higher crystallinity and a higher melting point (compared with propylene polymers that have a $^{13}$C-NMR isotacticity of 90 to <96%, which may also be used).

For the purposes of this invention, HDPE or MDPE are preferred polyethylenes. Generally, like HDPE and MDPE, these polyethylenes are not compatible with polypropylene and form a separate phase in the mixture with polypropylene. The presence of a separate phase is demonstrated for example in a DSC measurement by a separate melting peak in the range of the melting temperature of polyethylene, generally in a range from 115-145° C., preferably 120-140° C. HDPE generally has an MFI (50 N/190° C.) greater than 0.1 to 50 g/10 min, preferably 0.6 to 20 g/10 min, measured in accordance with DIN 53 735 and a crystallinity of 35 to 80%, preferably 50 to 80%. The density, measured at 23° C. in accordance with DIN 53 479, method A, or ISO 1183, is in the range from >0.94 to 0.97 g/cm³. The melting point, measured with DSC (maximum of the melting curve, heating rate 20° C./min), is between 120 and 145° C., preferably 125-140° C.

Suitable MDPE generally has an MFI (50 N/190° C.) of greater than 0.1 to 50 g/10 min, preferably 0.6 to 20 g/10 min, measured in accordance with DIN 53 735. The density, measured at 23° C. in accordance with DIN 53 479, method A, or ISO 1183, is in the range from 0.925 to 0.94 g/cm³. The melting point, measured with DSC (maximum of the melting curve, heating rate 20° C./min), is between 115 and 130° C., preferably 120-125° C.

It is also advantageous for the purposes of the invention that the polyethylene has a narrow melting range. This means that in a DSC of the polyethylene at the start of the melting range and the end of the melting range are no more than 10K, preferably 3 to 8K apart. For these purposes, the extrapolated onset is taken as the start of the melting range, and the extrapolated end of the melting curve is correspondingly taken to represent the end of the melting range (heating rate 10K/min).

The parameters "melting point" and "melting range" are determined by DSC measurement and read off from the DSC curve, as described for the measuring methods.

The layer also includes a propylene block copolymer as a further component. Propylene block copolymers of such kind have a melting point above 140 and up to 170° C., preferably from 150 to 165° C., particularly from 150 to 160° C., and a melting range that begins above 120° C., preferably in a range from 125-140° C. The comonomer content, which is preferably ethylene, is between for example 1 and 20% by weight, preferably between 1% and 10% by weight. The melt flow index of propylene block copolymers is generally in a range from 1 to 20 g/10 min, preferably 1 to 10 g/10 min.

The layer may also include other polyolefins beside the propylene homopolymer and the propylene block copolymer. The fraction of these other polyolefins is generally below 10% by weight, preferably in a range from 0 to 5% by weight. Other polyolefins are for example statistical copolymers of ethylene and propylene with an ethylene content of 20% by weight or less, statistical copolymers of propylene with $C_4$-$C_8$ olefins having an olefin content of 20% by weight or less, terpolymers of propylene, ethylene and butylene having an ethylene content of 10% by weight or less and having a butylene content of 15% by weight or less, or other polyethylenes, such as LDPE, VLDPE and LLDPE.

In general, all known auxiliary additives that promote the formation of β-crystals of polypropylene when a polypropylene melt is cooled are suitable for use as the β-nucleating agents for the microporous layer. Such β-nucleating agents, and their mode of action in a polypropylene matrix, are known in their own right from the prior art, and will be described in detail in the following.

Various crystalline phases of polypropylene are known. When a molten mass cools, it is usually mainly α-crystalline PP that forms, with a melting point at approximately 158-162° C. By implementing a certain temperature program, it is possible to ensure that a small proportion of a β-crystalline phase is formed upon cooling, with a melting point in a range from 140-150° C., markedly lower than that of the monoclinic α-modification. Additives are known in the related art that cause formation of a higher proportion of the β-modification when polypropylene cools, including for example γ-quinacridone, dihydroquinacridine, or calcium salts of phthalic acid.

For the purposes of the present invention, preferably highly active β-nucleating agents are used, which form a β-fraction of 40-95%, preferably 50-85% (DSC), when a propylene homopolymer melt (PP-fraction 100%) cools down. The β-fraction is determined from the DSC of the cooled propylene homopolymer melt. For this, for example a two-component nucleating system of calcium carbonate and organic dicarboxylic acids as suitable, such as is described in DE 3610644, which document is expressly included herewith by reference. Particularly advantageous are calcium salts of dicarboxylic acids such as calcium pimelate or calcium suberate, as are described in DE 4420989, which is also expressly included by reference. The dicarboxamides described in EP-0557721, particularly N,N-dicyclohexyl-2,6-naphthalene dicarboxamide, are also suitable β-nucleating agents.

Besides the nucleating agents, in order to obtain a high fraction of β-crystalline polypropylene it is also important to maintain a certain temperature range and residence times at these temperatures as the melt film is cooling. Cooling of the melt film preferably takes place at a temperature of 60 to 140° C., particularly 80 to 130° C. A slow cooling process also promotes the growth of the β-crystallites, so the drawing speed, that is to say the speed at which the melt film runs over the first cooling roller, should be slow to ensure that the necessary residence times at the selected temperatures are long enough. The drawing speed is preferably less than 25 m/min., particularly 1 to 20 m/min.

Particularly preferred embodiments of microporous foil according to the invention contain 50 to 10,000 ppm, preferably 50 to 5000 ppm, particularly 50 to 2000 ppm calcium pimelate or calcium suberate as the β-nucleating agent.

The composition according to the invention of the foil comprising propylene homopolymer, propylene block copolymer, β-nucleating agent and polyethylene exhibits a characteristic pattern of at least 3 peaks in the DSC measurement during the second melting process. These peaks are attributable to the α-crystalline propylene homopolymer, the β-crystalline phase of the propylene homopolymer, and the polyethylene. According to a DSC measurement, the foil according to the invention thus has one peak in the range from 115-145° C. for the polyethylene, one peak in the range from 140-155° C. for the β-crystalline polypropylene, and a third peak in the range from 155-175° C. for the α-crystalline polypropylene.

The microporous membrane foil consists of a single layer. The thickness of the membrane foil is generally in a range from 10 to 100 µm, preferably 15 to 60 µm. The microporous foil may be subject to a corona, flame or plasma treatment to improve its filling with electrolyte.

The density of the microporous membrane foil is generally in a range from 0.1 to 0.6 g/cm$^3$, preferably 0.2 to 0.5 g/cm$^3$. In order to be used as the separator in batteries, the foil should have a Gurley value from 50 to 5000 s, preferably from 100 to 2500 s. The bubble point of the foil should not be above 350 nm, it should preferably be in the rang from 50 to 300 nm, and the average pore diameter should be in the range from 50 to 100 nm, preferably in the range from 60-80 nm.

The porous foil according to the invention is preferably produced in the known flat film extrusion process.

During this process, the mixture of propylene homopolymer, propylene block copolymer, polyethylene and β-nucleating agent in the layer is melted in an extruder and extruded through a flat nozzle onto a take-off roller, on which the melt film solidifies and cools, forming the β-crystallites. The cooling temperatures and times are programmed such that the highest possible fraction of β-crystalline polypropylene is formed in the prefilm. The content of β=crystals is slightly lower than in pure polypropylene foils, because of the polyethylene fraction. In general, the content of β-crystallites in the prefilm is 30-85%, preferably 40-80%, especially 60-70%. This prefilm with high content of β-crystalline polypropylene is then stretched biaxially in such a way that the β-crystallites are converted into α-polypropylene. Finally, the biaxially stretched foil undergoes heat setting, and possibly surface corona, plasma or flame treatment.

The biaxial stretching (orientation) is generally carried out in consecutive steps, and the material is preferably stretched lengthwise first (in the direction of the machine) and then transversely (perpendicularly to the machine).

The take-off roller or rollers are kept at a temperature of 60 to 135° C., preferably 100 to 130° C., to promote formation of a high fraction of β-crystalline polypropylene.

When stretching lengthwise, the temperature is below 140° C., preferably 70 to 120° C. The longitudinal stretching ratio is in the range from 2.0:1 to 5:1 Transverse stretching takes place at a temperature from 120-145° C., which should be selected such that the transverse stretching temperature is not substantially higher than the melting point of the polyethylene. In general, the transverse stretching temperature may be up to 5° C., preferably up to 3° C. above the melting point of the polyethylene. If the transverse stretching temperature is below the melting point of the polyethylene, the differences may be greater, for example up to 20° C., preferably up to 10° C. In this case, the transverse stretching temperature will be programmed on the basis of the stretchability of the polypropylene content in the foil. The transverse stretching ratio is in a range from 2.0:1 to 9:1, preferably 3:1-8:1.

Lengthwise stretching may be performed expediently using two rollers running at different speeds corresponding to the desired stretching ratio, and transverse stretching with an appropriate tenter.

The biaxial foil stretching process is generally followed by thermal fixing (heat treatment), wherein the foil is exposed to a temperature of 110 to 140° C., preferably 115 to 130° C. for about 0.5 to 500 s, preferably 10 to 300 s, for example via rollers or an air heater box. The temperature in thermal fixing should be set such that the temperature the foil reaches as it passes through the fixing field is lower than the melting point of the polyethylene, or not more than 1 to 2° C. above it. The foil is then rolled up in the normal way with a takeup mechanism.

As indicated above, if applicable one surface of the foil may be subjected to one of the known corona, plasma or flame treatment methods after biaxial stretching.

The following measuring methods were used to characterize the raw materials and foils:

Melt Flow Index

The melt flow index of the propylene polymers was measured in accordance with DIN 53 735 under a load of 2.16 kg and at 230° C., and at 190° C. with a load of 2.16 kg for polyethylenes.

Melting Points and Melting Ranges

Because of their different crystalline ranges, or phases, partly crystalline thermoplastic polymers such as propylene polymers do not have a single defined melting point, but rather a melting range. Melting point and melting range are therefore values that are derived very accurately from a DCS curve for the respective polymer. In DSC measurement, a quantity of heat per unit of time is introduced to the polymer at a defined heating rate, and the heat flux is plotted against the temperature, that is to say the change in enthalpy is measured as the divergent course of the heat flux from the baseline. The baseline is understood to be the (linear) component of the curve in which no phase conversions are taking place. Here, the heat quantity applied and the temperature are in a linear relationship with one another. In the range in which melting processes take place, the heat flux increases by the energy required for melting and the DSC curve climbs. In the range in which most crystallites are melting, the curve reaches a maximum value and falls back to the baseline. For the purposes of the present invention, the melting point is the maximum value of the DSC curve. For the purposes of the present invention, the start of the melting range is the temperature at which the DSC curve deviates from the baseline and the DSC curve begins to rise. Conversely, the end of the melting range is the temperature at which the DSC curve has fallen back to the level of the baseline. The temperature difference between the start and end is the melting range.

In order to determine the melting point and the melting range, the sample is melted and cooled again for the first time in a range from 20 to 200° C. and with a heating and cooling speed of 10K/1 min. Then, a second DSC curve is recorded (20-200° C. and 10K/1 min) in the normal way and under the same conditions, and this second heating curve is evaluated as described.

β-Content of the Prefilm

The β-content of the prefilm is also determined by DSC measurement, which is carried out on the prefilm as follows: first, the prefilm is heated to 220° C. and melted in the DSC at a heating rate of 10K/min, then cooled again. From the first heating curve, the degree of crystallinity $K_{\beta,DSC}$ is determined as a ratio of the enthalpies of fusion of the β-crystalline phase ($H_\beta$) to the total of the enthalpies of fusion for the β- and α-crystalline phases ($H_\beta+H_\alpha$).

Density

Density is determined in accordance with DIN 53 479, method A.

Permeability (Gurley Value)

The permeability of the foils was measured in accordance with ASTM D 726-58 using the 4110 Gurley Tester. The time taken by 100 cm$^3$ air to permeate through the label area of 1 inch$^2$ (6.452 cm$^2$) is determined in seconds. The pressure differential over the foil corresponds to the pressure of a 12.4 cm high water column. The time taken is then recorded as the Gurley value.

Shut-Off Function

The shut-off function is determined by Gurley measurements before and after a heat treatment lasting 5 min at 130° C. The Gurley value of the foil is measured as described in the preceding. Then, the foil is exposed to a temperature of 130° C. for five minutes in a heating furnace. After this, the Gurley value is calculated again as described. The shut-off function is considered to be in effect when the foil has a Gurley value of at least 5000 s and has increased by at least 1000 s after the heat treatment.

The invention will now be explained with the following examples.

EXAMPLE 1

After the extrusion process, a single-layer prefilm was extruded through a flat sheet die at an extrusion temperature of 240 to 250° C. This prefilm was first drawn off and cooled on a cooling roller. Then, the prefilm was orientated longitudinally and transversely, and finally heat-set. The composition of the foil was as follows:

Approx. 60% by weight high isotactic propylene homopolymerisate (PP) with a $^{13}$C-NMR isotacticity of 97% and an n-heptane soluble fraction of 2.5% by weight (relative to 100% PP) and a melting point of 165° C.; and a melt flow index of 2.5 g/10 min at 230° C. under a load of 2.16 kg (DIN 53 735), and Approx. 20% by weight HDPE (High Density Polyethylene) having a density of 0.954 (ISO 1183) and an MFI of 0.4 g/10 min at 190° C. under a load of 2.16 kg (ISO 1133/D) or 27 g/10 min at 190° C. under a load of 21.6 kg (ISO 1333/G), and melting point of 130° C. (DSC: peak at 10K/min heating rate), the melting range begins at 125° C.

Approx. 20% by weight Propylene-ethylene block copolymerisate used with an ethylene fraction of 5% by weight relative to the block copolymer and an MFI (230° C. and 2.16 kg) of 6 g/10 min and a melting point (DSC) of 165° C., and 0.04% by weight Ca pimelate as the β-nucleating agent.

The foil also contained the standard, small quantities of stabiliser and neutraliser.

After extrusion, the melted polymer mixture was drawn off and solidified via a first take-off roller and a further triple roller set, then it was stretched lengthwise, stretched transversely and heat-set under the following programmed conditions:

| | |
|---|---|
| Extrusion: | Extrusion temperature 235° C. |
| Take-off roller: | Temperature 125° C., |
| Drawing speed: | 4 m/min |
| Longitudinal stretching: | Stretching roller T = 90° C. |
| Longitudinal stretching by Factor 3.0 | |
| Transverse stretching: | Heating panels T = 125° C. |
| Draw panels | T = 125° C. |
| Transverse stretching by Factor 5.0 | |
| Heat-setting: | T = 125° C. |

The porous foil thus created was about 25 μm thick and had a density of 0.38 g/cm$^3$, and had an even, white-opaque appearance.

EXAMPLE 2

A foil was produced as described in example 1. In contrast to example 1, the fraction of propylene homopolymer was reduced to 55% by weight and the fraction of HDPE was increased to 25% by weight. The rest of the composition and the processing conditions were unchanged. The porous foil produced in this way was about 24 μm thick, with a density of 0.42 g/cm$^3$ and had an even, white-opaque appearance.

EXAMPLE 3

A foil was produced as described in example 1. In contrast to example 1, the HDPE was replaced with 20% by weight of an MDPE having a density of 0.954 g/cm$^3$ (ISO 1183) and an MFI of 0.4 g/10 min at 190° C. under load of 2.16 kg (ISO 1133/D) or 27 g/10 min at 190° C. under load of 21.6 kg (ISO 1333/G), and a melting point of 130° C. (DSC: peak at 10° C./min heating rate), the melting range beginning at 125° C. The transverse stretching temperature was reduced to 120° C. The rest of the composition and the other process conditions were unchanged. The porous foil produced in this way was about 24 μm thick, with a density of 0.42 g/cm$^3$ and had an even, white-opaque appearance.

EXAMPLE 4

A foil was produced as described in example 1. In contrast to example 1, the high isotactic polypropylene homopolymerisate was also replaced with a normal polypropylene having $^{13}$C-NMR isotacticity of 94% and an n-heptane soluble fraction of 2.5% by weight (relative to 100% PP) and a melting point of 161° C.; and a melt flow index of 2.5 g/10 min at 230° C. under load of 2.16 kg (DIN 53 735). The porous foil produced in this way was about 25 μm thick with a density of 0.38 g/cm$^3$, and had a white-opaque appearance.

COMPARISON EXAMPLE 1

A foil was produced as described in example 1. In contrast to example 1, the foil contained no polyethylene. The fraction of propylene homopolymerisate was increased correspondingly to 20% by weight. The porous foil produced in this way was about 25 μm thick with a density of 0.38 g/cm³ and had a white-opaque appearance.

COMPARISON EXAMPLE 2

A foil was produced as described in example 1. The composition of the foil was not changed. In contrast to example 1, in this case the foil was stretched transversely at a temperature of 135° C. The porous foil produced in this way was about 25 μm thick with a density of 0.38 g/cm³ and had a white-opaque appearance.

The Gurley values before and after heat treatment and the e-moduli of the foils according to the examples and comparison examples are summarised in the following table.

TABLE

| Example | Gurley value [s] | Gurley value after thermal treatment (5 min @ 130° C.) [s] | E-modulus in MD/TD [N/mm²] |
|---|---|---|---|
| Ex. 1 | 460 | 9000 | 820/1800 |
| Ex. 2 | 620 | 15000 | 700/1400 |
| Ex. 3 | 860 | 12000 | 800/1700 |
| Ex. 4 | 400 | 6700 | 800/1400 |
| Comp. ex 1 | 400 | 600 | 820/1800 |
| Comp. ex 2 | 5500 | 18000 | 920/1700 |

The invention claimed is:

1. A biaxially oriented, single-layer, microporous foil with shut-off function whose microporosity is created by converting β-crystalline polypropylene when the foil is stretched, and which contains propylene homopolymer and propylene block copolymer and β-nucleating agent and polyethylene, wherein the foil has a Gurley value of 50 to 5000 s, an e-modulus in the lengthwise direction of 300-1800 N/mm², and of 400-3000 N/mm² in the transverse direction, and wherein after heat treatment of the foil by exposure to a temperature of 130° C. for 5 minutes the foil exhibits a Gurley value of at least 5000 s and wherein the Gurley value after the heat treatment is at least 1000 s higher than before the heat treatment.

2. The foil as claimed in claim 1, wherein the polyethylene has a melting point of 115-140° C.

3. The foil as claimed in claim 1, wherein the polyethylene has a narrow melting range and wherein the polyethylene at the start of the melting range and at the end of the melting range are no more than 10 K apart.

4. The foil as claimed in claim 1, wherein the polyethylene is a HDPE or a MDPE.

5. The foil as claimed in claim 1, wherein the foil contains 15-45% by weight polyethylene relative to the weight of the foil.

6. The foil as claimed in claim 1, wherein the foil contains 45 to 75% by weight propylene homopolymer, 10 to 45% by weight propylene block copolymer and 50 to 10,000 ppm β-nucleating agent.

7. The foil as claimed in claim 1, wherein the propylene homopolymer is a high isotactic polypropylene having a chain isotaxy ($^{13}$C-NMR) of 95 to 98%.

8. The foil as claimed in claim 1, wherein the propylene homopolymer is an isotactic polypropylene having a chain isotaxy ($^{13}$C-NMR) of 90 to <96%.

9. The foil as claimed in claim 1, wherein the nucleating agent is a calcium salt of pimelic acid or of suberic acid or is a carboxamide.

10. The foil as claimed in claim 1, wherein the density of the foil is in a range from 0.1 to 0.6 g/cm³.

11. The foil as recited claimed in claim 1, wherein after the heat treatment of the foil by exposure to a temperature of 130° C. for 5 minutes the foil exhibits a Gurley value of at least 8000 s.

12. The foil as claimed in claim 1, wherein the foil has a thickness of 15 to 100 μm.

13. A method for producing the foil as claimed in claim 1, which comprises producing the foil in a flat film extrusion process and that take-off roller temperature is in a range from 60 to 130° C.

14. The method as claimed in claim 13, wherein an unstretched prefilm has a β-crystallite content of 30 to 85%.

15. The method as claimed in claim 13, wherein the film is stretched transversely at a temperature no more than 2° C. higher than the melting point of the polyethylene.

16. A separator in a battery or a rechargeable battery which comprises the foil as claimed in claim 1.

17. A biaxially oriented, single layer, microporous foil having a shut-off function comprising: propylene homopolymer; propylene block copolymer; β-nucleating agent; and polyethylene; and wherein the foil has a Gurley value of 50 to 5000 s; and wherein the shut-off function comprises an increase of at least 1000 s in the Gurley value of the foil after heat treatment at a temperature of 130° C. for 5 minutes.

18. The foil of claim 17 wherein microporosity is created in the foil by converting β-crystalline polypropylene when the foil is stretched.

19. The foil of claim 17 further comprising an E-modulus in the lengthwise direction of 300-1800 N/mm² and of 400-3000 N/mm² in the transverse direction.

20. A battery separator comprising a biaxially oriented single layer microporous foil having a shut-off function comprising: propylene homopolymer; propylene block copolymer B-nucleating agent; and polyethylene; and wherein the battery separator has a Gurley value of 50 to 5000 s; and wherein the shut-off function comprises an increase of at least 1000 s in the Gurley value of the battery separator after heat treatment of the battery separator at a temperature of 130° C. for 5 minutes.

* * * * *